US007995713B2

(12) United States Patent
Fratti

(10) Patent No.: US 7,995,713 B2
(45) Date of Patent: Aug. 9, 2011

(54) VOICE-IDENTIFICATION-BASED SIGNAL PROCESSING FOR MULTIPLE-TALKER APPLICATIONS

(75) Inventor: Roger A. Fratti, Mohnton, PA (US)

(73) Assignee: Agere Systems Inc., Allentown, PA (US)

( * ) Notice: Subject to any disclaimer, the term of this patent is extended or adjusted under 35 U.S.C. 154(b) by 1486 days.

(21) Appl. No.: 11/396,789

(22) Filed: Apr. 3, 2006

(65) Prior Publication Data

US 2007/0263846 A1 Nov. 15, 2007

(51) Int. Cl.
*H04M 1/64* (2006.01)
*H04B 17/02* (2006.01)

(52) U.S. Cl. .............. 379/88.02; 455/136; 455/138

(58) Field of Classification Search ............ 379/202.01, 379/88.02; 704/231, 225; 396/287; 455/411, 455/416, 518, 136, 138; 370/280; 327/50
See application file for complete search history.

(56) References Cited

U.S. PATENT DOCUMENTS

| | | | |
|---|---|---|---|
| 4,499,578 A | 2/1985 | Marouf et al. ................. 370/62 |
| 4,500,842 A * | 2/1985 | Virupaksha et al. ............ 327/50 |
| 4,797,924 A | 1/1989 | Schnars et al. ................. 381/43 |
| 4,856,072 A | 8/1989 | Schneider et al. ............. 381/86 |
| 4,912,766 A * | 3/1990 | Forse ............................ 704/225 |
| 5,239,586 A | 8/1993 | Marui ............................ 381/47 |
| 5,365,583 A | 11/1994 | Huang et al. .................. 379/390 |
| 5,774,841 A * | 6/1998 | Salazar et al. ................. 704/225 |
| 5,801,616 A | 9/1998 | Ghazarian et al. ............ 340/426 |
| 5,896,450 A | 4/1999 | Kurihara ....................... 379/387 |
| 5,930,748 A | 7/1999 | Kleider et al. ................ 704/219 |
| 6,453,285 B1 | 9/2002 | Anderson et al. ............. 704/210 |
| 6,633,632 B1 | 10/2003 | Harlow et al. ................ 379/188 |
| 6,882,971 B2 | 4/2005 | Craner ........................... 704/246 |
| 6,959,074 B2 | 10/2005 | Berstis ...................... 379/202.01 |
| 7,403,766 B2 * | 7/2008 | Hodge .......................... 455/411 |
| 7,423,983 B1 * | 9/2008 | Li et al. ......................... 370/280 |
| 2002/0090094 A1 | 7/2002 | Amir et al. ..................... 381/92 |
| 2003/0101052 A1 | 5/2003 | Chen et al. .................... 704/223 |
| 2003/0112947 A1 | 6/2003 | Cohen ...................... 379/202.01 |

(Continued)

FOREIGN PATENT DOCUMENTS

WO WO 03/026349 A1 3/2003

OTHER PUBLICATIONS

"Audio Gain Control Using Digital Potentionmeters"—AN1828, A254 [retrieved on Dec. 28, 2005], retrieved from the Internet: http://www.maxim-ic.com/appnotes_frame.cfm/appnote_number/appnotes.cfm/appnote_number/1828, Dec. 2002, 8 pages.

"How Does Speech Recognition Work?" by James Matthews, [retrieved on Dec. 28, 2005], retrieved from the Internet: http://www.generation_5.org/content/2002/howsrworks.asp, Submitted: Oct. 23, 2002, 3 pages.

(Continued)

*Primary Examiner* — Thjuan K Addy
(74) *Attorney, Agent, or Firm* — Mendelsohn, Drucker, & Associates, P.C.; Edward J. Meisarosh; Steve Mendelsohn

(57) ABSTRACT

The audio signals associated with different co-located groups of talkers in a teleconference are detected (e.g., by comparing the voiceprint for the current talker group with stored voiceprints corresponding to all of the co-located teleconference participants) and processed using different and appropriate automatic gain control (AGC) levels, where each group has a corresponding stored AGC level. Depending on the embodiment, each group may have one or more participants.

21 Claims, 4 Drawing Sheets

U.S. PATENT DOCUMENTS

2004/0128137 A1 7/2004 Bush et al. .................... 704/275
2005/0043014 A1* 2/2005 Hodge .......................... 455/411
2005/0060148 A1* 3/2005 Masuda et al. ................ 704/231
2005/0260985 A1 11/2005 Rader et al.
2006/0140620 A1* 6/2006 Fujii ............................. 396/287

OTHER PUBLICATIONS

"Transmitter Audio Gain vs Signal to Noise Ratio," [retrieved on Dec. 28, 2005], retrieved from the Internet: http://www.lectronsonics.com/service/txgain.htm, 2 pages.

* cited by examiner

VOICE-IDENTIFICATION-BASED SIGNAL PROCESSING FOR MULTIPLE-TALKER APPLICATIONS

BACKGROUND OF THE INVENTION

1. Field of the Invention

This invention relates generally to telecommunications systems, and more particularly to audio signal processing for teleconferencing systems where multiple talkers share a sound transceiver.

2. Description of the Related Art

Teleconferences often have multiple talkers at a single site. Such talkers typically share a sound transceiver. A typical shared sound transceiver includes a microphone and a speaker. The sound received at the microphone is converted into an electrical signal for processing and transmission to remotely located teleconferencing participants via suitable electrical, optical, and/or wireless communication networks. The elements processing the electrical signal typically include an automatic gain control (AGC) circuit, which adjusts, by appropriate amplification or attenuation, the electrical signal so that the amplitude of the adjusted electrical signal is generally within some acceptable range. This is done so that the adjusted signal's amplitude is neither too high nor too low. The adjusted signal may undergo additional processing steps to improve sound quality (e.g., reduce noise) or increase transmission efficiency, and may be added to one or more other signals for transmission to the remote locations. Typically, the adjusted signal is eventually received at sound transceivers of the other participants and converted back to sound.

The AGC processing of the electrical signal corresponding to the received sound is typically based on the composite and time-averaged characteristics of the received sound. When a teleconference having multiple participants at a single site includes, for example, a loud talker positioned close to the microphone and a soft talker positioned far from the microphone, AGC processing based on the time-averaged characteristics of both talkers will tend to insufficiently amplify signals corresponding to the soft talker and insufficiently attenuate signals corresponding to the loud talker, resulting in less than desirable playback at the remote locations.

SUMMARY OF THE INVENTION

One embodiment of the invention is a method of processing an audio signal, the method comprising: (a) processing the audio signal to identify a first reference voiceprint; (b) assigning an AGC level to the first reference voiceprint; and (c) applying the AGC level assigned to the first reference voiceprint to AGC processing of a first portion of the audio signal corresponding to the first reference voiceprint. Another embodiment of the invention is an audio processing apparatus comprising: control logic adapted to (a) process the audio signal to identify a first reference voiceprint and (b) assign an AGC level to the first reference voiceprint; and a signal processor adapted to apply the AGC level assigned to the first reference voiceprint to AGC processing of a first portion of the audio signal corresponding to the first reference voiceprint.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In a preferred embodiment, the present invention is a system that identifies a current talker based on the talker's voiceprint, finds or assigns an AGC level for the current talker, and applies that AGC level to AGC processing of signals corresponding to the talker. The system can store voiceprints and corresponding AGC levels during a training mode, or do so on the fly as talkers talk during a conference call.

Figure 1:
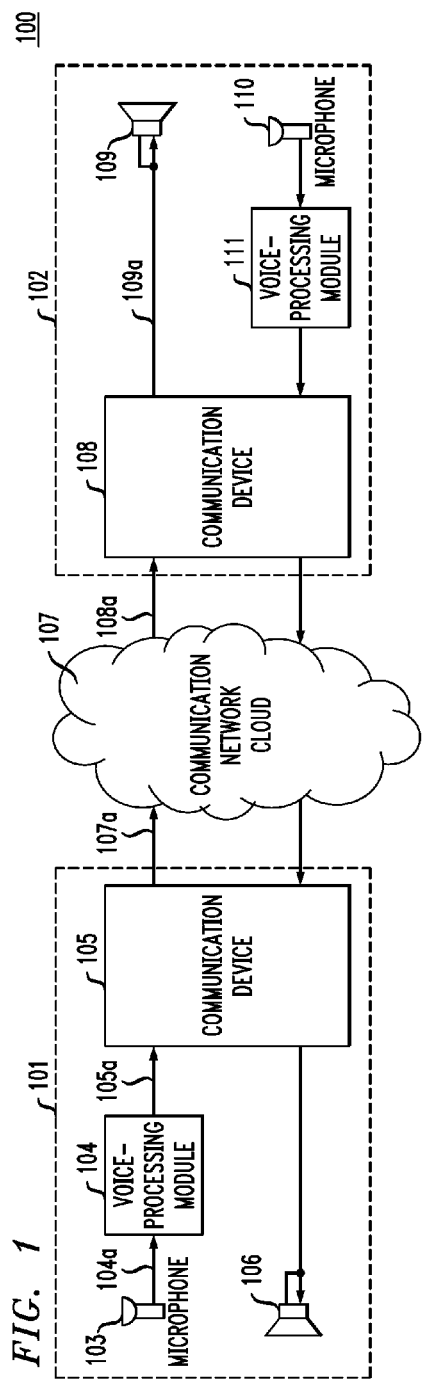
FIG. 1 is a simplified block diagram of a communications system according to one embodiment of the present invention.

FIG. 1 shows a simplified block diagram of a communications system 100, according to an exemplary embodiment of the present invention implementing distributed processing such that each local conference node processes its own outgoing signal. As shown in FIG. 1, communications system 100 includes two (or more) conference nodes (101, 102) communicating via communication network cloud 107. Each conference node comprises a microphone (103, 110), a voice-processing module (104, 111), a speaker (106, 109), and a communication device (105, 108).

Microphone 103 of conference node 101 captures the ambient sound, which may include the voice of a current talker and any background noise, and converts the sound into a corresponding electrical signal 104a. Signal 104a is received by voice-processing module 104, which processes the signal in accordance with the present invention. Voice-processing module 104 outputs processed electrical signal 105a to communications device 105. Communication device 105 interfaces with communication network cloud 107, to which it transmits signal 107a, which includes a signal substantially corresponding to signal 105a. Communication network cloud 107 transmits and processes signal 107a in any appropriate way that allows it to output to remote conference node 102 a signal 108a that includes a signal substantially identical to signal 107a. Communication device 108 of conference node 102 receives and processes signal 108a and outputs signal 109a to speaker 109, which converts signal 109a to audible sound so that a listener near speaker 109 would hear the current talker in the vicinity of microphone 103 in accordance with this embodiment of the invention. Analogous processing is performed by corresponding elements for audio signal processing and transmission from conference node 102 to conference node 101.

Figure 2:
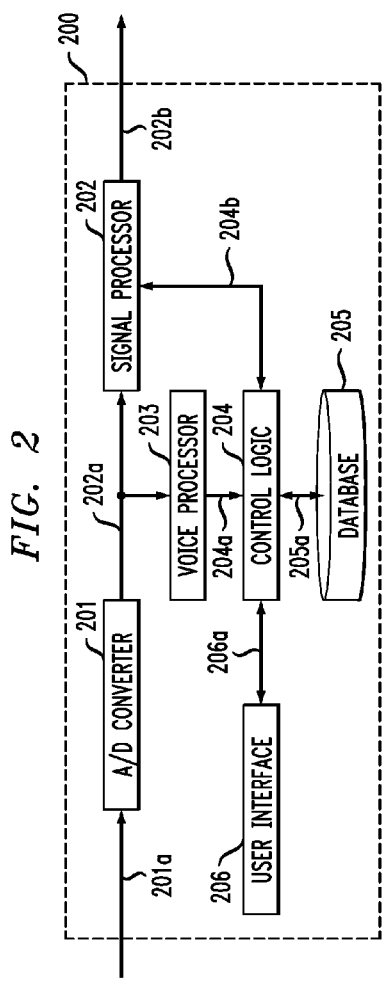
FIG. 2 is a simplified block diagram of an implementation of each voice-processing module of FIG. 1.

FIG. 2 shows a block diagram of voice-processing module 200, which may be used to implement each of voice-processing modules 104 and 111 of FIG. 1. Voice-processing module 200 includes A/D converter 201, voice processor 203, signal processor 202, control logic 204, database 205, and user interface 206. A/D converter 201 receives analog signal 201a from a microphone (e.g., 103 or 110 of FIG. 1) and generates corresponding digital signal 202a. Note that, if the microphone generates digital signals, then A/D converter 201 may be omitted. Digital signal 202a is input into signal processor 202 and voice processor 203. Voice processor 203 generates voiceprints corresponding to continuous samples of the received signal in accordance with any of the methods known in the art, such as by generating parameters from spectrum, cepstrum, and/or other analysis of the signal.

The voiceprints generated by voice processor 203 are transmitted via signal 204a to control logic 204, which, for each voiceprint, determines whether there is a matching voiceprint in database 205. Database 205 is adapted to store voiceprints and affiliated AGC levels; it communicates with control logic 204 via signal 205a. If control logic 204 finds a matching voiceprint to the current voiceprint in database 205, then the associated AGC level is retrieved by control logic 204, and may be stored in a cache-like memory together with the retrieved or received voiceprint, which serves as a reference voiceprint. Control logic 204 then transmits the retrieved AGC level via signal 204b to signal processor 202, which comprises an AGC circuit. Signal processor 202 applies the AGC level received from control logic 204 during its AGC processing of signal 202a, and transmits the output as signal 202b. The reference voiceprint can be compared to the voiceprints being generated by voice processor 203 so that there is no need to search the database while the generated voiceprint matches the reference voiceprint. While the current talker keeps talking, the AGC circuit may adjust its AGC level in accordance with the current talker's signal characteristics. If the current talker is done talking (for example, when control logic 204 determines that a new talker is talking), then control logic 204 may retrieve the current talker's last AGC level from signal processor 202 via signal 204b to update the corresponding entry in database 205 with this AGC level.

If control logic 204 does not find a voiceprint in affiliated database 205 that matches the voiceprint of the current talker, then control logic 204 generates an AGC level for the current voiceprint by, for example, retrieving the current AGC level from signal processor 202, and stores the voiceprint and the associated AGC level as a new entry in database 205. The generated voiceprint can then be used as a reference voiceprint. Segments of the audio signal that contain only background noise will cause the generation of one or more background noise voiceprints. The affiliated AGC levels, which will be used in the processing of the audio signal corresponding to background noise, should be assigned so as to reduce the amplification of background noise. Since background noise is likely to appear frequently in the audio signal, its voiceprint can be used as a second reference voiceprint and stored in a local cache for faster comparisons. In addition to the automatic processing described, a user can adjust the AGC level associated with the current voiceprint through user interface 206. User interface 206 may also be used to initialize and control operating and/or training modes of voice-processing module 200, or to provide information about the current talker or talker group.

Figure 3:
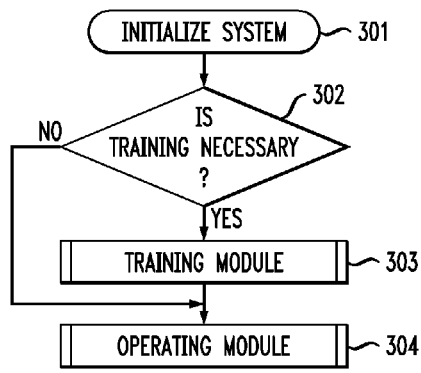
FIG. 3 shows a flowchart for the voice-processing module of FIG. 2.

FIG. 3 shows a flowchart for system 200 of FIG. 2, in accordance with one embodiment of the present invention. First, the system is initialized (step 301). Initialization 301 can be induced by powering on the system, resetting it, or otherwise indicating that a new operational phase is about to commence. Initialization 301 can occur automatically, or can be triggered manually by a user through user interface 206 of FIG. 2. Next, the system determines whether training is necessary (step 302). The system may determine that training is necessary if, for example, it checks for a voiceprint database and finds it to be empty, or fails to find one. The system may, for example, be set to automatically enter training mode, or to automatically skip training mode. If training is necessary, then the system enters the training module (step 303). An example of a training module in accordance with an embodiment of the present invention appears in FIG. 4. After the system exits the training module, the system enters the operating module (step 304). If the system determines that training is not necessary in step 302, then the system enters the operating module directly from step 302. An example of an operating module in accordance with an embodiment of the present invention appears in FIG. 5.

Figure 4:
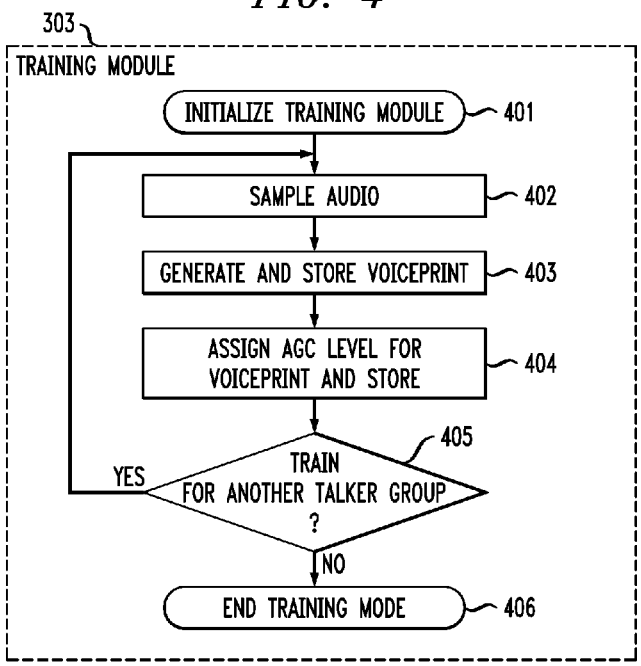
FIG. 4 shows a flowchart for the training module of FIG. 3.

FIG. 4 shows a flowchart for an optional training module 303 of FIG. 3. In a preferred embodiment of the training module, each talker introduces himself or herself, thereby providing the requisite voice samples for the generation of voiceprints. First, the training module is initialized (step 401), which can be accomplished as described above in relation to step 301 of FIG. 3. Next, the system samples a first talker's voice (step 402). Next, voice processor 203 of FIG. 2 analyzes the voice sample to generate a characteristic voiceprint, which control logic 204 stores in database 205 (step 403). The voiceprint contains information characterizing the talker's voice and timbre. This information is used to distinguish among talkers and identify each talker when he or she talks. Next, control logic 204 determines and assigns an AGC level for the voiceprint, e.g., based on the corresponding processing of the AGC circuit in signal processor 202, and stores that AGC level in database 205 so that it is associated with its respective voiceprint (step 404).

Next, control logic 204 determines whether it needs to train for another voice (step 405). Control logic 204 can make this determination automatically by continuously sampling, analyzing, and processing the input signal until some terminating event occurs. A terminating event can occur, for example, if a user, using user interface 206, manually indicates that training mode is over, or if control logic 204 determines that a talker is talking continuously for a time longer than some set limit, or if control logic 204 determines that a new talker is in fact a prior talker (e.g., if anyone but the last talker starts talking after everyone has introduced him or herself). Control logic 204 can also, for example, determine whether to train for another voice based on user input through user interface 206. If control logic 204 determines it needs to train for another voice, then steps 402-405 are repeated again. Thus, control logic 204 loops through steps 402-405 for as long as training is necessary. If control logic 204 determines it does not need to train for another voice, then the training mode ends and control logic 204 exits the training module (step 406).

Figure 5:
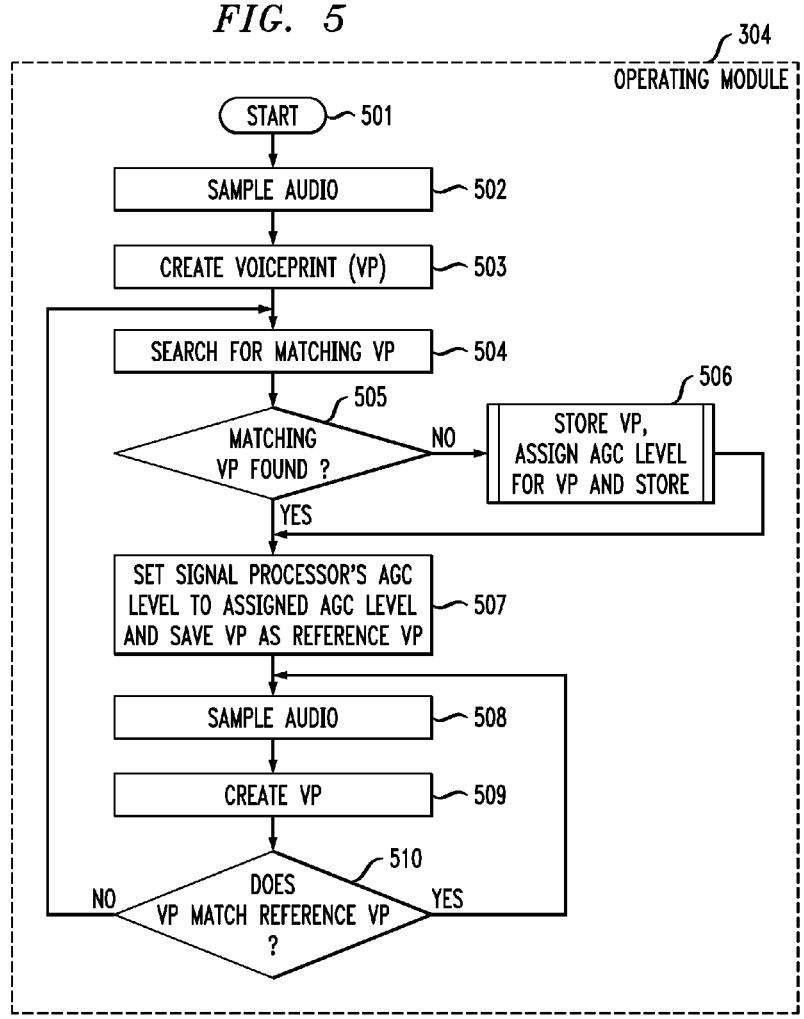
FIG. 5 shows a flowchart for the operating module of FIG. 3.

FIG. 5 shows a flowchart for operating module 304 of FIG. 3. The operating module starts at step 501. This is typically accomplished by the termination of training module 303 of FIG. 3, or by the determination that training is not necessary (step 302 of FIG. 3). Next, the current talker's voice is sampled (step 502). Voice processor 203 of FIG. 2 analyzes the sample to create a voiceprint (step 503). Control logic 204 searches for a matching voiceprint in database 205 (step 504). Periods when no one is talking, i.e., samples containing only background noise, are given their own voiceprints. These background noise voiceprints can be distinguished from talker voiceprints since their spectral characteristics are distinguishable from speech spectral characteristics through means well known in the art. AGC levels for background noise voiceprints are assigned differently than for talker voiceprints since it is generally desirable to attenuate background sounds rather than amplify them.

If control logic 204 does not find a matching voiceprint (step 505), then control logic 204 determines that a new talker is talking, and control logic 204 determines an appropriate AGC level and stores the voiceprint and the corresponding AGC level in the database (step 506). Processing then proceeds to step 507. In an alternative embodiment (not illustrated), if control logic 204 does not find a matching voiceprint in step 505, then control logic 204 does not instruct signal processor 202 to change the current AGC level in step 507.

If a matching voiceprint is found in step 505, then processing proceeds directly to step 507, in which control logic 204 sets the current AGC level of signal processor 202 to the AGC level associated with the voiceprint of the current talker, and saves the corresponding voiceprint as a reference voiceprint in a local cache. In one possible embodiment (not illustrated), control logic 204 proceeds from step 507 directly to step 502 without saving a reference voiceprint, and continues from there. However, since that embodiment would require frequent searching of the database (step 504), in a preferred embodiment, the system continues to sample the audio signal (step 508), analyze it to create a voiceprint (step 509), and then determine whether the voice is new, i.e., whether a new talker is speaking (step 510), e.g., by having control logic 204 compare the current voiceprint with the reference voiceprint stored in its local cache. The system continues to repeat steps 508-510 until control logic 204 determines that a new talker is speaking in step 510. Until then, while the system repeats steps 508-510, signal processor 202 continues to perform AGC processing without receiving any new AGC level from control logic 204. Signal processor 202 will typically adjust the AGC level over time as part of its normal AGC processing.

If control logic 204 determines that a new speaker is talking in step 510 (e.g., the current voiceprint is sufficiently different from the reference voiceprint), then the process returns to step 504 to search for a matching voiceprint in database 205. A single person can cause sufficiently distinct voiceprints to be generated at different times, and therefore be identified as more than one talker if, for example, that person changes location relative to the microphone, or sufficiently changes his or her speaking tone at the different times.

The operations of FIGS. 3-5 enable system 101 of FIG. 1 to process audio signals corresponding to different talkers using different, appropriate AGC levels. For example, the signals corresponding to a loud talker positioned close to a microphone will be processed using a different AGC level from that used to process the signals corresponding to a soft talker positioned far from that microphone. In that way, the loud talker's signals will be appropriately attenuated, while the soft talker's signals will be appropriately amplified. The result will be an improved audio playback at the remote conference nodes in which both loud and soft talkers will be better able to be heard and understood.

Figure 6:
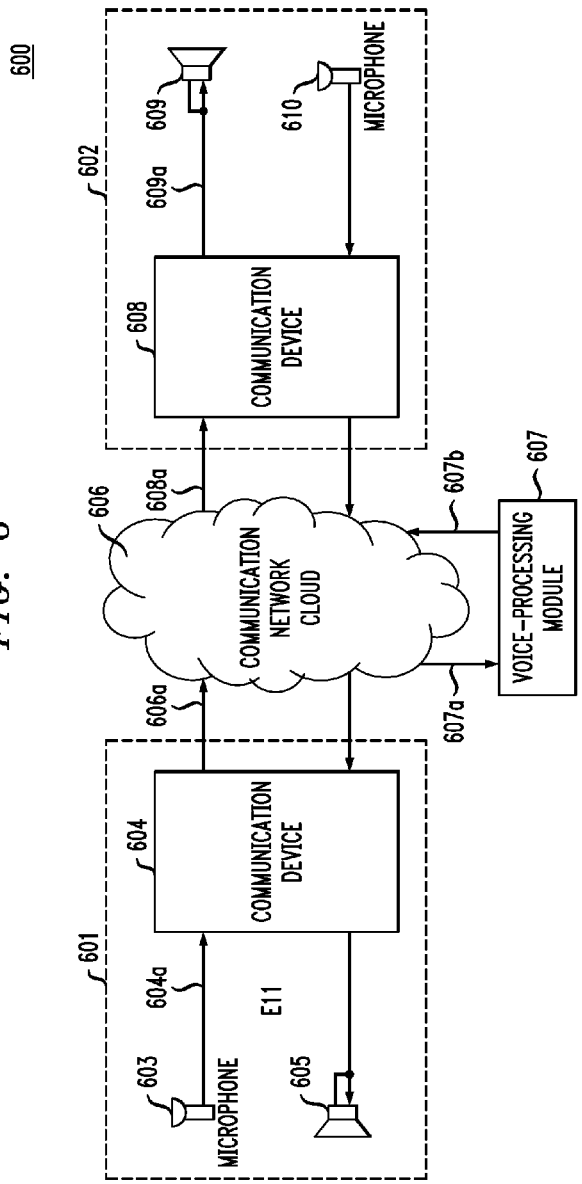
FIG. 6 is a simplified block diagram of a communications system according to a second embodiment of the present invention.

FIG. 6 shows a simplified block diagram of communication system 600 according to an alternative embodiment of the present invention with centralized processing such that the signal processing in accordance with the invention is performed by a centralized, shared voice-processing module 607 affiliated with communication network cloud 606. Teleconference nodes 601 and 602 comprise elements analogous to the elements, in FIG. 1, of teleconference nodes 101 and 102, respectively, but without a local voice-processing module, however, with means, as are known in the art, for interfacing with any user interface element of voice-processing module 607 (e.g., user interface 206 in FIG. 2).

For example, microphone 603 of node 601 converts an audio signal corresponding to a talker into electrical signal 604a, which goes into communication device 604. Communication device 604 processes signal 604a, performing functions such as amplification, equalization, noise reduction, etc., and then transmits signal 606a, which includes a signal corresponding to signal 604a, to communication network cloud 606. Network cloud 606 provides signal 607a, a signal corresponding to signal 606a, to voice-processing module 607, which operates substantially similarly to voice-processing module 200 of FIG. 2, to process signal 606a. Voice-processing module 607 then outputs signal 607b to communications network cloud 606, which in turn provides corresponding signal 608a to communication device 608 of teleconference node 602, wherein speaker 609 outputs an audio signal enhanced in accordance with an embodiment of the present invention. A similar path operates in reverse, starting with microphone 610 in node 602 and going to speaker 605 in node 601.

The above descriptions are of a preferred embodiment; however, many variations are possible which do not depart from the present invention. For example, in an alternative embodiment, if control logic 204 of FIG. 2 does not find a matching voiceprint, then it determines a new AGC setting based on characteristics (e.g., amplitude) of the current talker's audio signal or, alternatively, it sets the signal processor's AGC level to a default AGC level. The structures can be replicated and combined as necessary to account for multiple sites or multiple microphones at a site. Thus, for example, additional microphones can be connected to voice-processing module 104, and processed signals from other systems can be combined with signal 107a in communications network cloud 107 of FIG. 1, or with signal 606a in communication network cloud 606 of FIG. 6. Not all nodes in a distributed embodiment of the invention need to use the invention; a teleconference can connect any number of nodes that include a voice-processing module embodying the invention and any number of nodes that do not. Communications signals such as 107a, 108a, 606a, and 608a can be electrical, optical, wireless, or other format, and can be analog or digital. Additional variations as known to one of ordinary skill in the art are possible and do not depart from the claims of the present invention.

In another alternative embodiment, microphone 103 of FIG. 1 (and other microphones) can output digital signals thus making A/D converter 201 of FIG. 2 unnecessary. Also, signal processor 202 can be analog or digital and can get its input directly from a microphone (e.g., 103 or 110), or from intermediary devices. Some elements described, such as the local cache in control logic 204, are part of a preferred embodiment, but are not required for operation. Signal processor 202 can comprise adjustable signal processing circuits in addition to an AGC circuit, and settings for these circuits can be set, stored, retrieved, and used in substantially the same way as described for the AGC level. The various settings for signal processor 202 can be treated in aggregate as a signal processing profile that includes at least the AGC level.

In another alternative embodiment, a voiceprint identifies a group of one or more individual talkers. Individuals with sufficiently similar speech characteristics are treated as a talker group and share a voiceprint and the associated AGC level. This can be accomplished, for example, by lowering the resolution of the voiceprint generated by voice processor 203, by employing a different process to generate voiceprints, such as using processing parameters generated by an audio encoder, or by altering the matching algorithm used by control logic 204. Under this alternative embodiment, group-describing information could be associated with a talker type. Just as one person can be identified at different times as different talkers, so too a person could belong to more than one talker group. Thus, a talker group can contain more than one person, and a person can belong to more than one talker group.

In another alternative embodiment of training module 303 of FIG. 4 (not illustrated), the processing characteristics can be assigned or adjusted manually by a user. This allows a user to override the automatic settings to ensure, for example, that a particular talker or talker type is heard more loudly than others.

Embodiments of the present invention have been described using certain functional units. These units were chosen for convenience of description and do not represent the only way to organize the units' multiple sub-functions. A sub-function described as performed by one functional unit can typically be performed by other functional units. The signal paths drawn and described are not exclusive and can be altered without material modification of function. The communication signals used can generally be in any medium (e.g., electrical, electromagnetic, or optical) and in any domain (e.g., digital or analog), although the signals used among the elements of voice-processing module 200 are preferably electrical and digital. Furthermore, the talkers, individual or group, can be any sound-producing systems, whether human vocal chords, other living beings, electrical, mechanical, musical, or other sound generating devices.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

What is claimed is:

1. A method of processing an audio signal, the method comprising:
   (a) processing a first portion of the audio signal to generate a first voiceprint;
   (b) accessing a database of zero or more stored voiceprints, each stored voiceprint having a corresponding stored AGC level, to determine whether the first voiceprint matches a stored voiceprint in the database; and
   (c) if a first matching voiceprint is found in step (b), then:
      (c1) retrieving from the database the stored AGC level corresponding to the first matching voiceprint; and
      (c2) applying the retrieved AGC level corresponding to the first matching voiceprint to AGC processing of the first portion of the audio signal.

2. The method of claim 1, further comprising:
   (d) processing a second portion of the audio signal to generate a second voiceprint different from the first voiceprint;
   (e) accessing the database to determine whether the second voiceprint matches a stored voiceprint in the database; and
   (f) if a second matching voiceprint different from the first matching voiceprint is found in step (e), then:
      (f1) retrieving from the database the stored AGC level corresponding to the second matching voiceprint; and
      (f2) applying the retrieved AGC level corresponding to the second matching voiceprint to AGC processing of the second portion of the audio signal.

3. The method of claim 1, further comprising updating, in the database, the stored AGC level corresponding to the first matching voiceprint based on the AGC level at the end of the AGC processing of the first portion of the audio signal.

4. The method of claim 2, further comprising:
   (g) then processing a third portion of the audio signal to generate a third voiceprint different from the second voiceprint;
   (h) then accessing the database to determine whether the third voiceprint matches a stored voiceprint in the database; and
   (i) if the first matching voiceprint is found to match the third voiceprint in step (h) then:
      (i1) retrieving from the database the stored AGC level corresponding to the first matching voiceprint; and (i2) applying the retrieved AGC level corresponding to the first matching voiceprint to AGC processing of the third portion of the audio signal.

5. The method of claim 1, wherein:
(d) if the database does not contain a stored voiceprint that matches the first voiceprint, then:
(d1) assigning an AGC level to the first voiceprint; and
(d2) storing the first voiceprint as a new stored voiceprint in the database along with the assigned AGC level.

6. The method of claim 1, wherein:
each stored voiceprint corresponds to a talker group; and
each talker group comprises one or more talkers.

7. The method of claim 6, wherein at least one talker group comprises two or more talkers.

8. The method of claim 6, wherein:
each different stored voiceprint corresponds to a different talker group; and
at least one talker is part of two different talker groups.

9. The method of claim 6, further comprising performing training for at least one talker group, wherein the training comprises:
(i) receiving a portion of an audio signal corresponding to the at least one talker group;
(ii) generating a voiceprint corresponding to the portion of the audio signal;
(iii) determining an AGC level for the generated voiceprint; and
(iv) storing the voiceprint and the determined AGC level in the database.

10. The method of claim 5, wherein the assigned AGC level assigned to the first voiceprint is determined independently of the AGC processing of the first portion of the audio signal.

11. The method of claim 1, wherein step (c2) comprises adjusting the applied AGC level based on an operator input from a human user.

12. An audio processing apparatus comprising:
a database of zero or more stored voiceprints, each stored voiceprint having a corresponding stored AGC level;
control logic adapted to (a) process a first portion of the audio signal to generate a first voiceprint, (b) access the database to determine whether the first voiceprint matches a stored voiceprint in the database, and (c) retrieve, from the database, if a first matching voiceprint is found, the stored AGC level corresponding to the first matching voiceprint; and
a signal processor adapted to apply the retrieved AGC level corresponding to the first matching voiceprint to AGC processing of the first portion of the audio signal.

13. The apparatus of claim 12, wherein:
the control logic is further adapted to (d) process a second portion of the audio signal to generate a second voiceprint different from the first voiceprint, (e) access the database to determine whether the second voiceprint matches a stored voiceprint in the database, and (f) retrieve, from the database, if a second matching voiceprint different from the first matching voiceprint is found, the stored AGC level corresponding to the second matching voiceprint; and
the signal processor is further adapted to apply the retrieved AGC level corresponding to the second matching voiceprint to AGC processing of the second portion of the audio signal.

14. The apparatus of claim 12, wherein the control logic is further adapted to update, in the database, the stored AGC level corresponding to the first matching voiceprint based on the AGC level at the end of the AGC processing of the first portion of the audio signal.

15. The apparatus of claim 13, wherein:
the control logic is further adapted to:
process a third portion of the audio signal to generate a third voiceprint different from the second voiceprint; and
access the database to determine whether the third voiceprint matches a stored voiceprint in the database; and
the signal processor is further adapted to retrieve from the database, if the first matching voiceprint is found to match the third voiceprint, the stored AGC level corresponding to the first matching voiceprint and apply the retrieved AGC level corresponding to the first matching voiceprint to AGC processing of the third portion of the audio signal.

16. The apparatus of claim 12, wherein:
if the database does not contain a stored voiceprint that matches the first voiceprint, then the control logic (a) assigns an AGC level to the first voiceprint, and (b) stores the first voiceprint as a new stored voiceprint in the database along with the assigned AGC level.

17. The apparatus of claim 12, wherein the apparatus is located in a centralized location and configured to receive and process one or more audio signals from one or more remote locations.

18. Apparatus for processing an audio signal, the apparatus comprising:
(a) means for processing a first portion of the audio signal to generate a first voiceprint;
(b) means for accessing a database of zero or more stored voiceprints, each stored voiceprint having a corresponding stored AGC level, to determine whether the first voiceprint matches a stored voiceprint in the database;
(c) means for retrieving from the database, if a first matching voiceprint is found, the stored AGC level corresponding to the first matching voiceprint; and
(d) means for applying the retrieved AGC level corresponding to the first matching voiceprint to AGC processing of the first portion of the audio signal.

19. The method of claim 1, wherein:
the AGC processing comprises adjusting, by appropriate amplification or attenuation, the audio signal so that the amplitude of the adjusted audio signal is generally within some acceptable range; and
AGC level is a processing parameter used by an AGC circuit such that (1) if the first voiceprint is for a loud talker, then the corresponding AGC level would cause the AGC circuit to appropriately attenuate the loud talker's signal and (2) if the first voiceprint is for a soft talker, then the corresponding AGC level would cause the AGC circuit to appropriately amplify the soft talker's signal.

20. The method of claim 1, wherein the first portion of the audio signal is different from the first voiceprint.

21. The apparatus of claim 12, wherein
the first portion of the audio signal is different from the first voiceprint.

* * * * *